Figure 1:
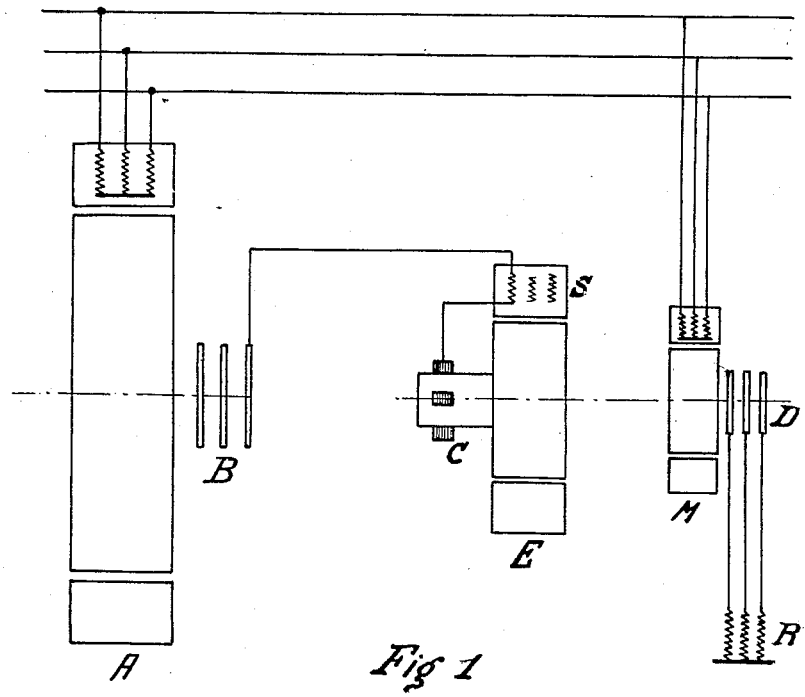

March 25, 1930.　　　P. LETRILLIART　　　1,751,484

COMPENSATED ASYNCHRONOUS ELECTRIC MOTOR

Filed June 11, 1928

Inventor
Pierre Letrilliart

Patented Mar. 25, 1930

1,751,484

UNITED STATES PATENT OFFICE

PIERRE LETRILLIART, OF PARIS, FRANCE, ASSIGNOR TO FORGES & ATELIERS DE CONSTRUCTIONS ELECTRIQUES DE JEUMONT, SOCIÉTÉ ANONYME, OF PARIS, FRANCE, A FRENCH JOINT-STOCK COMPANY

COMPENSATED ASYNCHRONOUS ELECTRIC MOTOR

Application filed June 11, 1928, Serial No. 284,233, and in France July 1, 1927.

This invention relates to asynchronous electric motors of the compensated type.

Compensation of the magnetizing power of an induction motor can be obtained under load by employing an exciter of the Latour-Leblanc type connected in cascade with the rotor of the induction motor and driven separately by a motor having a substantially constant speed irrespective of that of the principal motor.

This well known method presents certain disadvantages:—

(1) At full load, the slip of the induction motor compensated in this way is greater than that which the same motor would have with its rotor short-circuited. The additional slip is due to the increase of the Joule losses resulting from the increased rotor-circuit resistance and to the increase of the rotor current as soon as it is desired to overcompensate. Even for relatively low overcompensation, the slip of the compensated motor is twice that of the short-circuited motor, which is a serious disadvantage for certain applications such as the driving of compressors, blowing machines, etc., of which the yield or output is an increasing function of the speed.

(2) The method indicated does not allow compensation in running at low load; it is difficult to arrive at a power factor of unity for a load less than one third of the normal load, with a machine simply compensated at full load. This disadvantage is particularly noticeable in the case of variable load machines.

The present invention has for its object to remedy the disadvantages above mentioned by maintaining the phase-compensation constant within wide limits of variation of the load, without any considerable increase in the slip of the induction motor at full load, as compared with a similar motor provided with short circuited rotor.

The invention consists in the application, instead and in place of the exciter usually adopted, of a non-self-exciting machine of the series-wound generator type, having its stator windings connected between the rotor of the main motor and the brushes of its own commutator, the brushes being set behind the neutral axis as regards the direction of rotation by an angle less than 180 electrical degrees.

Since the cascaded machine operates as a series generator upon which there are imposed a voltage and a frequency of external origin, it possesses a resistant torque which is a function of the load on the main motor and increases with the load. By driving the machine by means of a suitable auxiliary motor at variable speed, there can be obtained for the group a characteristic curve of speed and power factor practically independent of the load. For this purpose, the auxiliary motor driving the cascaded machine, instead of being of the ordinary constant speed type, is a motor of which the speed falls considerably when the load increases; for example a series commutator machine or an asynchronous motor with fixed rotor resistance, if this motor is connected to an alternating current supply. There is no fear of excessive loss in the rotor resistance because the auxiliary motor is of small power.

In these conditions, the dynamic or equivalent resistance of the cascaded commutator motor being negative there is a partial compensation of the ohmic resistances by the special exciter. It will be understood that in these conditions, the slip can be reduced, without however being ever reduced to zero, for the series machine is utilized not as self-exciting machine in excited working, but as a generator upon which there are imposed a voltage and a frequency of external origin. It is known that these two methods of operation are essentially different. According to the invention, it is essential to avoid the machine working as self-excited.

Upon the accompanying drawing, there is represented diagrammatically in Figure 1, a method of carrying out the invention.

A is the main asynchronous motor of which the slip-rings B are connected to the series exciter E. This exciter comprises a stator winding S in series with the commutator C. It is driven by an asynchronous motor M of which the slip-rings D are connected to a slip rheostat R.

Figure 2:
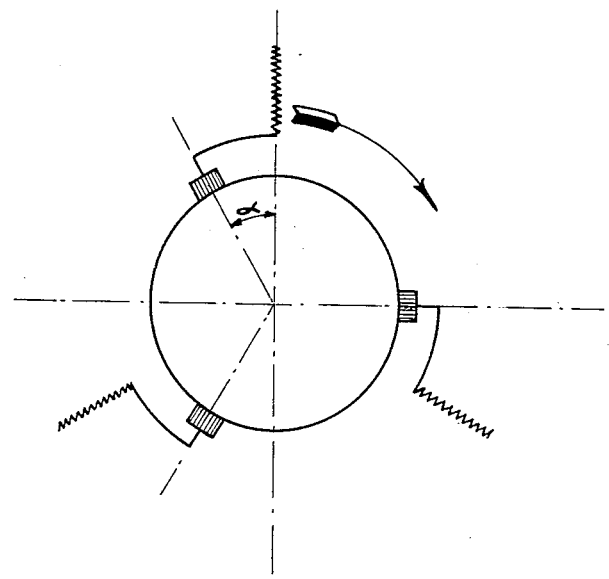

Figure 2 shows the angular direction of the negative lead or shifting of the exciter brushes in relation to the direction of rotation.

The operation of the motor arranged in accordance with the invention is as follows: The exciter, comprising a stator winding and having negative brush lead, possesses a resistant torque which is a function of the load on the main motor and increases with that load. The speed of the auxiliary driving motor and therefore of the exciter varies then in an inverse manner to the load on the main motor and the compensation is maintained constant within wide limits of variation of the load, from about one-tenth of the load up to full load.

It can easily be shown that the slip of the main motor compensated by a variable-speed series-wound exciter in accordance with the invention, remains practically constant under varying load. This slip is substantially equal to what would be the slip of the main motor if provided with short-circuited rotor windings.

What I claim is:—

1. In combination with an asynchronous electric motor, an exciter formed by a series commutator machine having its brushes set at negative lead angles and being connected in cascade with the rotor of said asynchronous motor, and an auxiliary motor driving said exciter independently of said asynchronous motor, said auxiliary motor being adapted to fall off in speed with an increase of load.

2. In combination with an asynchronous electric motor, an exciter formed by an alternating current commutator machine having its stator windings connected in cascade with the rotor of said asynchronous electric motor and in series with the respective commutator brushes, said brushes being set at angles less than 180 electrical degrees behind the neutral commutation axis, and an auxiliary motor driving said exciter independently of said asynchronous motor, said auxiliary motor being adapted to fall off in speed with an increase of load.

3. In the art of compensated electric induction motors, a series-characteristic cascade-connected exciter having its brushes set at negative lead angles and means for driving said exciter at a speed which decreases with an increase of load and independently of the induction motor.

4. In the art of compensated electric induction motors, a cascade-connected exciter having its brushes set at negative lead angles and in series with the respective stator coils, said exciter being driven independently at a speed varying in an inverse manner to the load upon the induction motor.

5. An asynchronous electric motor having stator windings adapted to be connected to a source of alternating current supply, and a wound rotor connected to slip-rings, in combination with a commutator machine driven independently of said asynchronous motor, said commutator machine having stator coils connected in cascade between the respective commutator brushes and the slip-rings of said rotor, and said commutator brushes being set at negative lead angles, and an auxiliary motor driving said exciter, said auxiliary motor being adapted to fall off in speed with an increase of load.

6. An asynchronous electric motor, having a separately driven commutator machine connected in cascade with the rotor of the main motor for phase compensation, characterized by the fact that the commutator machine is non-self-exciting and of the series-wound generator type, having its stator windings connected to brushes set behind the neutral axis by an angle less than 180 electrical degrees and that the commutator machine is driven at variable speed by an auxiliary motor of which the speed falls considerably when the load increases, with the object of obtaining for the group a characteristic curve of power factor and speed practically independent of the load.

In testimony whereof I hereunto affix my signature.

PIERRE LETRILLIART.